United States Patent
Pressler et al.

(10) Patent No.: US 8,109,384 B2
(45) Date of Patent: Feb. 7, 2012

(54) CONVEYOR AND METHOD FOR SPACING PACKAGES

(75) Inventors: Eric M. Pressler, New Orleans, LA (US); Mark Costanzo, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 196 days.

(21) Appl. No.: 12/671,265

(22) PCT Filed: Aug. 22, 2008

(86) PCT No.: PCT/US2008/074057
§ 371 (c)(1),
(2), (4) Date: Jan. 29, 2010

(87) PCT Pub. No.: WO2009/026536
PCT Pub. Date: Feb. 26, 2009

(65) Prior Publication Data
US 2010/0200365 A1    Aug. 12, 2010

Related U.S. Application Data

(60) Provisional application No. 60/957,267, filed on Aug. 22, 2007.

(51) Int. Cl.
*B65G 17/24* (2006.01)

(52) U.S. Cl. .............. 198/779; 198/459.7; 198/460.1; 198/853

(58) Field of Classification Search .............. 198/779, 198/345.3, 459.6, 459.7, 459.8, 460.1, 461.1–461.3, 198/853
See application file for complete search history.

(56) References Cited

U.S. PATENT DOCUMENTS

| | | | |
|---|---|---|---|
| 4,869,360 A * | 9/1989 | Brown et al. | 198/460.1 |
| 5,038,921 A | 8/1991 | Hoppmann et al. | |
| 5,190,137 A * | 3/1993 | Tas | 198/387 |
| 5,547,004 A * | 8/1996 | Fransen | 198/419.3 |
| 6,318,544 B1 | 11/2001 | O'Connor et al. | |
| 6,321,896 B1 | 11/2001 | Zuccheri et al. | |
| 6,390,285 B2 | 5/2002 | deGeus et al. | |
| 6,808,062 B2 * | 10/2004 | Cerutti et al. | 198/434 |
| 7,017,733 B2 | 3/2006 | Pfankuch | |
| 7,249,671 B2 | 7/2007 | Riddick et al. | |
| 7,290,649 B2 | 11/2007 | Wolkerstorfer | |
| 7,311,192 B2 | 12/2007 | Fourney | |
| 7,506,750 B2 | 3/2009 | Costanzo et al. | |
| 7,537,105 B2 | 5/2009 | Fourney | |
| 7,665,598 B2 * | 2/2010 | Begin et al. | 198/419.3 |
| 2003/0079962 A1 * | 5/2003 | Cerutti et al. | 198/459.1 |
| 2004/0065526 A1 * | 4/2004 | Zeitler | 198/460.1 |
| 2007/0144868 A1 * | 6/2007 | Zeitler et al. | 198/460.1 |
| 2008/0121498 A1 * | 5/2008 | Costanzo et al. | 198/779 |
| 2008/0264757 A1 * | 10/2008 | Fourney | 198/345.3 |
| 2010/0193329 A1 * | 8/2010 | Wargo et al. | 198/459.6 |

* cited by examiner

*Primary Examiner* — Mark A Deuble
(74) *Attorney, Agent, or Firm* — James T. Cronvich

(57) ABSTRACT

A spacing conveyor having article-accelerating rollers and selectively retractable stops to control the gaps between consecutive conveyed packages. A sensor measures the length of a package being fed onto the spacing conveyor. A controller selectively actuates one or more actuators positioned along the length of the conveyor to move selected stops advancing with the conveyor from a retracted position to a blocking position to receive packages a variety of sizes and to control the gaps between consecutive packages.

19 Claims, 3 Drawing Sheets

CONVEYOR AND METHOD FOR SPACING PACKAGES

BACKGROUND

The invention relates generally to power-driven conveyors and, more particularly, to conveyors and methods for controlling the gap between consecutive articles, such as packages, conveyed in a single file.

In some conveyor applications, it is important to control the spacing, or gap, between the tail end of a leading package and the head end of a trailing package. If the gaps are too great, throughput is decreased. If the gaps are too small, consecutive packages interfere with each other at downstream processing or sorting locations. Controlling these gaps is especially difficult when the packages vary in size, shape, or orientation. Thus, there is a need for a conveyor that can control the spacing between consecutive packages.

SUMMARY

This need and other needs are satisfied by a spacing conveyor embodying features of the invention. One version of such a spacing conveyor comprises a conveying surface, such as a conveyor belt, having retractable stops at spaced apart locations along the length of the conveying surface and article-supporting rollers protruding above the conveying surface to a roller top level. The conveying surface advances from an upstream end to a downstream end in a conveying direction. A bearing surface near the conveying surface contacts the rollers and causes them to rotate as the conveying surface advances. The rotating rollers propel articles supported atop the rollers along the conveying surface in the conveying direction. An actuator is selectively movable into contact with the retractable stops to move them from a retracted position below the roller top level to a blocking position above the roller top level. In the blocking position, the stop is positioned to receive an article propelled forward by the rollers. A sensor upstream of the actuator measures the length of a conveyed article and provides a corresponding length signal. A controller, responding to the length signal, selectively actuates the actuator to move selected stops to the stop position according to the length of the conveyed article and a predetermined spacing between consecutive articles.

Another version of a spacing conveyor comprises a conveyor belt advancing along a carryway from an upstream end to a downstream end in a conveying direction. The conveyor belt includes a series of rows of belt modules linked together at hinge joints between adjacent rows into an endless conveyor belt having outer and inner sides. Retractable stops are positioned at spaced apart locations along the length of the conveyor belt. Article-supporting rollers have salient portions that protrude above the outer side to a roller top level. The salient portions are accessible from the inner side. A bearing surface next to the inner side of the belt loop contacts the salient portions of the rollers, which causes them to rotate as the belt advances in the conveying direction. The rollers propel articles supported atop the rollers along the outer side in the conveying direction. A sensor upstream of the bearing surface measures the length of a conveyed article. An actuator is selectively movable between two positions depending on the measured length of a conveyed article advancing onto the conveyor belt. The actuator contacts the retractable stops to move them from a retracted position below the roller top level to a blocking position above the roller top level. In the blocking position, the stop receives articles propelled by the rollers.

In yet another aspect of the invention, a method for controlling the gap between consecutive articles on a conveyor comprises: (a) moving a first stop of a stop of series of regularly spaced stops advancing with a spacing conveyor in a conveying direction into a blocking position; (b) measuring the length of an article being fed onto the spacing conveyor at an infeed; (c) propelling the article along the spacing conveyor to the first stop; and (d) moving a second stop into a blocking position, wherein the second stop is the stop that trails the first stop in the conveying direction by the smallest distance greater than or equal to the length of the article plus a predetermined minimum gap between consecutive articles.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
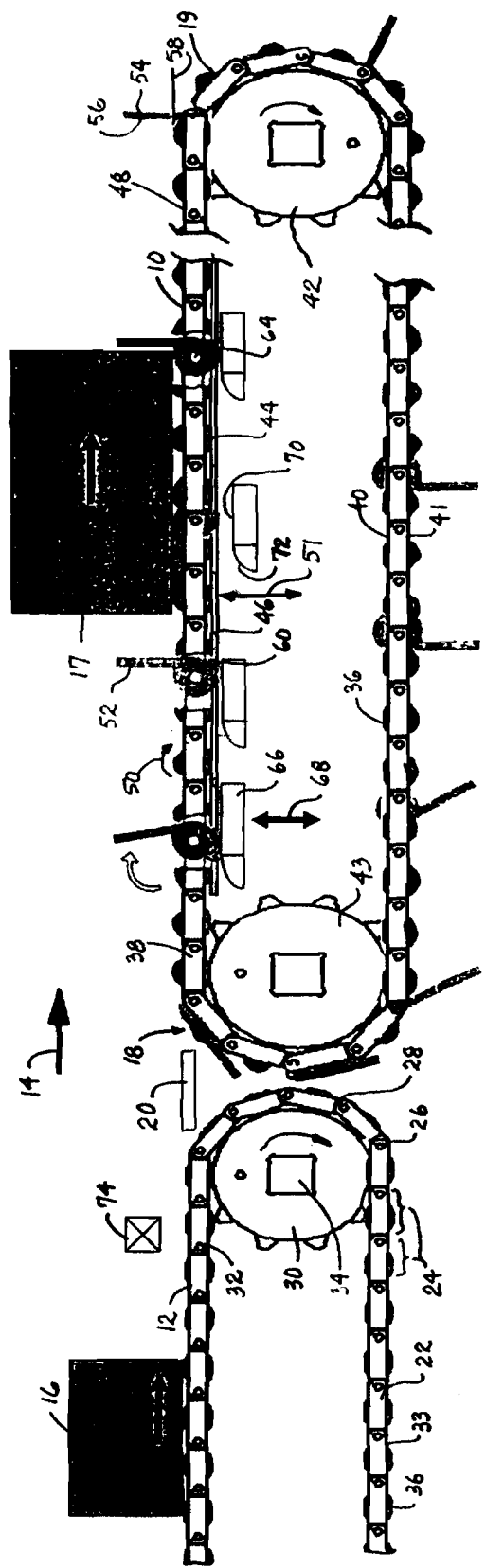
FIG. 1 is a side elevation view, partly cut away, of a portion of a conveyor system including a spacing conveyor embodying features of the invention.

A spacing conveyor embodying features of the invention is shown in a conveyor system in FIG. 1. The conveyor system comprises a spacing conveyor 10 downstream of an infeed conveyor 12. Both conveyors advance in the conveying direction 14, with the infeed conveyor feeding articles, such as packages 16, single file onto the upstream end 18 of the spacing conveyor across a transfer plate 20. The spacing conveyor transports the packages it receives toward its downstream end 19.

In a preferred embodiment, both the infeed conveyor and the spacing conveyor are realized as conveyor belts, such as modular plastic conveyor belts. The infeed belt 22 is shown as composed of a series of rows 24 of belt modules linked together by hinge pins 26 at hinge joints 28 between adjacent rows. The belt articulates at the hinge joints around drive sprockets 30 at its downstream end. The drive sprockets are mounted conventionally on a shaft (not shown) through central sprocket bores 34. The drive shaft is coupled to a motor (not shown), which rotates the shafts and the sprocket and drives the belt. The infeed belt shown in FIG. 1 is also characterized by article-supporting rollers 36 protruding past the outer surface 33 of the belt. But an infeed belt without rollers could be used as well.

Figure 2:
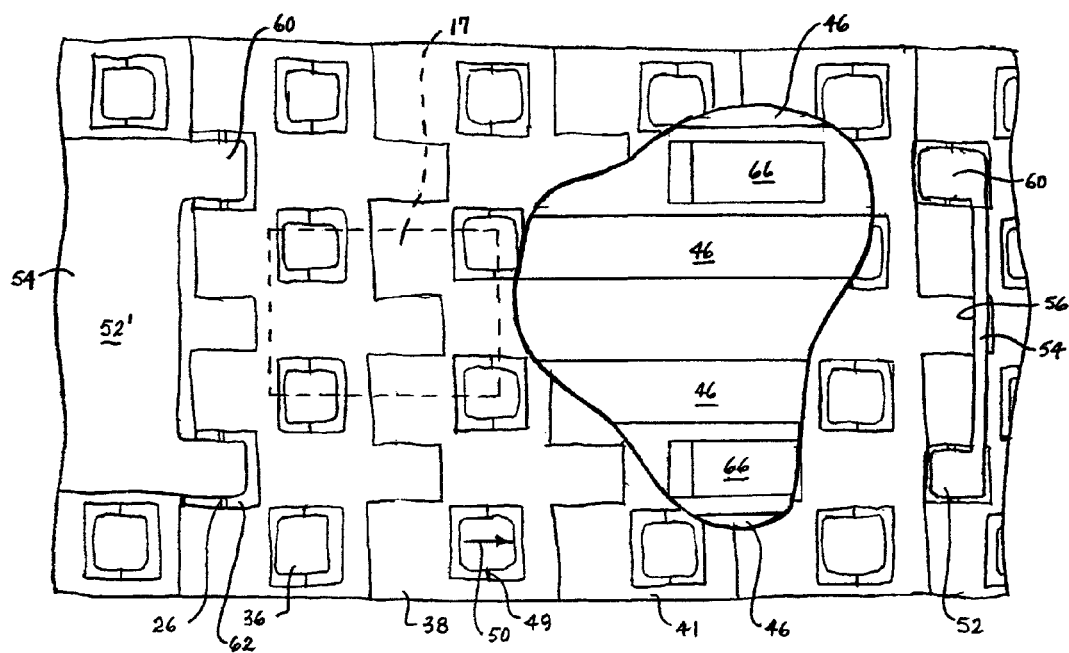
FIG. 2 is a top plan view, partially cut away, of a portion of the conveyor of FIG. 1.

Like the infeed belt, the spacing belt 38 is preferably a modular plastic conveyor belt with rollers 36 protruding past inner and outer surfaces 40, 41 of the belt loop. The belt is trained between one or more drive sprockets 42 at the downstream end and one or more idle sprockets 43 at the upstream end. Salient portions 44 of the rollers extend past the inner surface of the spacing belt into contact with bearing surfaces 46 underlying and supporting the belt on the rollers along an upper carryway portion 48 of the conveying path. As shown in FIG. 2, the bearing surfaces are positioned under the rollers along the carryway. The forward motion of the belt causes the rollers riding on the bearing surfaces to rotate in the direction of arrow 50 on axles 49. Packages 17 atop the rotating rollers are propelled in the conveying direction 14 by the rollers along the belt's outer conveying surface 41 at a speed greater than the speed of the belt. The bearing surfaces may be realized as one or more continuous surfaces underlying each lane of rollers or as segmented surfaces that could be selectively raised and lowered as indicated by arrow 51 or otherwise moved into and out of contact with the belt rollers by hydraulic, pneumatic, or electromechanical devices, to accelerate packages or not, as required.

The spacing belt also includes retractable stops 52 at spaced apart locations along the length of the belt. The stops in the example belt of FIGS. 1 and 2 are positioned on the hinge rod 26 between every third belt row. But the stops could be positioned between every row or spaced even farther apart than shown. The stops shown in the example have a plate-like portion 54 with a face 56 that receives a package propelled along the belt when the stop 52 is in a blocking position with its face above the roller top level 58. The plate-like portions are connected to roller portions 60 at each end, as shown in the cut away sections along the carryway in FIG. 1. The roller portions reside in gaps 62 between adjacent belt rows. A bore 64 through the roller portions receives the hinge rod 26, which serves as an axle on which the stop can rotate. Actuators 66 positioned along the carryway at one or more positions along the length of the conveyor are selectively movable into and out of contact with the retractable stops, such as up and down as indicated by arrow 68. The actuators are laterally aligned with the roller portions of the stops.

The actuators, which may be moved by any conventional means, such as hydraulics, pneumatics, electromagnetics, mechanical systems, or air bursts, have an upper cam surface 70 with an entrance ramp 72 on which the stop's roller portion 60 can ride as a cam follower. When in contact with the actuator's cam surface, the stop rotates on the hinge rod into the blocking position.

The stops are bistable with two stable positions: (a) the blocking position 52; and (b) a retracted position 52'. In the retracted position, the stop is below the roller top level 58 and cannot interfere with conveyed packages. Because the stops are bistable, once an actuator engages a stop on the carryway, the stop remains in the blocking position until gravity causes it to return to its refracted position as the belt articulates about the idle sprocket 43 on its return to the carryway. Thus, all the stops are automatically returned to their retracted positions just before entering the carryway.

Figure 3:
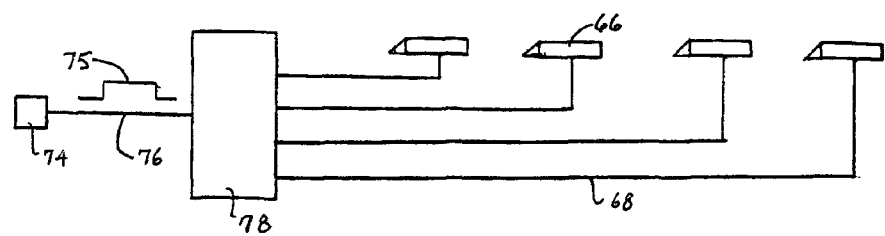
FIG. 3 is a block diagram illustrating the control of the conveyor of FIG. 1.

A sensor 74, such an optical sensor, is shown in FIG. 1 positioned at the downstream end of the infeed conveyor 12. The sensor, which may include a light source emitting a light beam across the conveyor to a photodetector, is used to measure the length of each package. The passage of a package through the beam shadows the photodetector for a time proportional to the length of the package. As shown in FIG. 3, the sensor outputs a signal 75 on a signal line 76 indicative of the time the beam is shadowed, which is proportional to the length of a passing package. The signal is sent to a controller 78, such as a programmable logic controller, a microcontroller, or other intelligent controller. With knowledge of the speed of the infeed conveyor, the controller can compute the length of the package by multiplying the speed by the time the beam was shadowed by the package. The controller then controls the activation of the one or more actuators 66 over control lines 68 to optimize the gap between consecutive packages.

Figure 4:
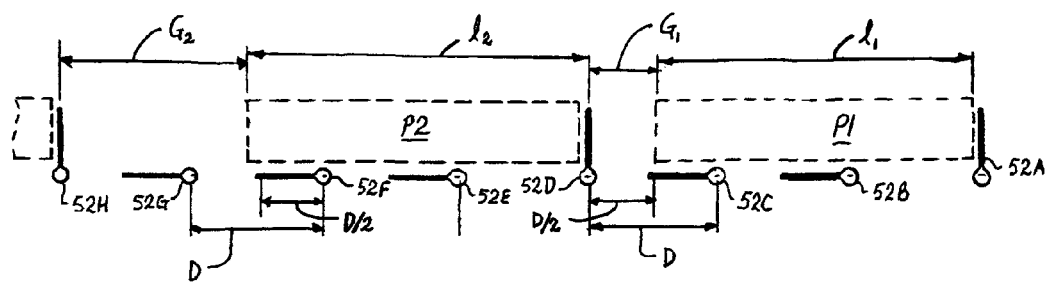
FIG. 4 is a side schematic of the conveyor of FIG. 1 illustrating one way of controlling the gap between consecutive packages.

The operation of the spacing conveyor as controlled by the controller is illustrated in FIG. 4. In the exemplary operating mode depicted, the controller is programmed to maintain a selectable or predetermined nominal gap G of D±D/2 (0.5 D to 1.5 D) between consecutive packages, where D is the distance between the positions of consecutive stops 52. Thus, in this example, the minimum allowed gap is 0.5 D. A first package P1 whose length $l_1$ has been measured by the sensors is propelled atop the rollers on the spacing conveyor to a stop 52A in the blocking position. Because the length of the package is between 2D and 3D, i.e., $2D < l_1 < 3D$, the controller does not send actuation signals to the actuators to move the following two stops 52B and 52C to the blocking position. They remain in the retracted position below the roller top level and out of contact with the package P1. Because $l_1 \lesssim 2.5$ D, or, more generally, ($l_1$ modulo D)$\leq 0.5$ D, the controller sends a signal to the actuator to move the next stop 52D to the blocking position. This sets a gap between the tail end of the package P1 and the head end of the trailing package P2 as $G_1 = 3D - l_1 \gtrsim 0.5D$. In other words, the second blocking stop 52D is the stop that trails the first blocking stop 52A by the smallest distance greater than or equal to the sum of the length of the package and the minimum gap allowed, or ($l_1 + 0.5$ D) in this example. The package P2 has a length $l_2$ as measured by the sensor and reported to the controller. After the trailing package P2 is fed onto the spacing belt, it is accelerated forward to the stop 52D already in the blocking position. Because $l_2 \gtrsim 2.5$ D, or, more generally, ($l_2$ modulo D)$\gtrsim 0.5$ D, the controller sends a control signal to the actuator to move the second trailing stop 52H to the blocking position. The stop 52G between the tail end of the package P2 and the next blocking stop 52H is maintained in its retracted position to ensure that a gap of at least D/2 is maintained. In this case, the gap $G_2$ between the tail end of the package P2 and the front end of a trailing package is given by $G_2 = 4D - l_2 \gtrsim 1.5D$. In this way, the spacing conveyor maintains a gap of 0.5 D to 1.5D between consecutive packages. Of course, it would be possible to program the controller to interpose greater gaps between consecutive packages. For example, where two lanes of packages are being conveyed on opposite sides of the spacing conveyor, either on a single belt with independently actuated stops or on each of a pair of side-by-side belts, it would be possible to stagger the packages from one lane to the other in anticipation of a clean merge downstream. In such a case, the gaps between consecutive stops in each package lane would have to be great enough to account for a staggered package in the other lane. And it is possible to achieve tighter controlled gaps by spacing the stops closer together along the length of the conveyor.

Although the spacing conveyor has been described in detail with reference to a preferred version, other versions are possible. For example, flat belts, slat conveyors, or other moving conveying surfaces with protruding rollers and retractable stops could be used instead of modular plastic conveyor belts. As another example, the stops do not have to rotate on hinge rods. They could alternatively pop up linearly when activated or be forced mechanically back to their retracted position. As yet another example, any sort of sensor that can measure the length of the packages can be used. And the actuators could be realized as rollers or as telescoping cam surfaces that may be extended along the length of the carryway to activate a selected number of consecutive stops. Furthermore, the description was written as though the length of a package is its actual length when properly oriented. But, for packages oriented off-axis or for non-rectangular packages or articles, the length of the package would be the length of the longest line segment through the package parallel to the conveying direction, and not its actual length. So, as these few examples suggest, the spirit and scope of the claims are not meant to be limited to the preferred version described in detail.

What is claimed is:

1. A spacing conveyor comprising:
a conveying surface advancing from an upstream end to a downstream end in a conveying direction and having a plurality of retractable stops at spaced apart locations along the length of the conveying surface and a plurality of article-supporting rollers protruding above the conveying surface to a roller top level;
a bearing surface disposed proximate the conveying surface to contact the rollers and cause the rollers to rotate as the conveying surface advances in the conveying direction and propel articles supported atop the rollers along the conveying surface in the conveying direction;
an actuator selectively movable into contact with the retractable stops to move the stops from a retracted position below the roller top level to a blocking position above the roller top level for receiving an article propelled by the rollers;
a sensor upstream of the actuator for measuring the length of a conveyed article and providing a corresponding length signal;
a controller selectively actuating the actuator in response to the length signal to move selected stops to the blocking position according to the length of the conveyed article and a predetermined spacing between consecutive articles.

2. A spacing conveyor as in claim 1 wherein the retractable stops are all in the refracted position just upstream of the actuator.

3. A spacing conveyor as in claim 1 wherein the retractable stops are rotated by the actuator from the retracted position to the blocking position.

4. A spacing conveyor as in claim 1 wherein retractable stops are uniformly spaced along the length of the conveying surface.

5. A spacing conveyor as in claim 1 wherein the rollers rotate on axes perpendicular to the conveying direction.

6. A spacing conveyor as in claim 1 wherein the rollers rotate on axes oblique to the conveying direction.

7. A spacing conveyor as in claim 1 wherein the sensor comprises an optical detector.

8. A spacing conveyor as in claim 1 wherein the actuator includes a cam and the stop includes a cam follower that rides on the cam to move the stop to the blocking position.

9. A spacing conveyor as in claim 1 wherein the actuator is selected from the group consisting of electrical actuators, electromagnetic actuators, mechanical actuators, pneumatic actuators, and air-burst actuators.

10. A spacing conveyor as in claim 1 comprising a plurality of the actuators disposed at spaced locations along the spacing conveyor.

11. A spacing conveyor as in claim 1 wherein the conveying surface comprises a series of rows of one or more belt modules hingedly linked together into an endless conveyor belt at hinge joints between adjacent rows.

12. A spacing conveyor as in claim 1 wherein the bearing surface comprises segmented surfaces selectively movable into and out of contact with the rollers.

13. A method for controlling the gap between consecutive articles on a conveyor, the method comprising:
moving a first stop of a series of regularly spaced stops advancing with a spacing conveyor in a conveying direction into a blocking position;
measuring the length of an article being fed onto the spacing conveyor at an infeed;
propelling the article along the spacing conveyor to the first stop;
moving a second stop into a blocking position, wherein the second stop is the stop that trails the first stop in the conveying direction by the smallest distance greater than or equal to the length of the article plus a predetermined minimum gap between consecutive articles.

14. The method of claim 13 further comprising retracting all the stops in a blocking position to an unblocking position just before the infeed of the spacing conveyor.

15. A conveyor comprising:
a conveyor belt advancing along a carryway from an upstream end to a downstream end in a conveying direction, the conveyor belt including:
a series of rows of one or more belt modules hingedly linked together at hinge joints between adjacent rows into an endless conveyor belt loop having an outer side and an inner side;
a plurality of retractable stops at spaced apart locations along the length of the conveyor belt;
a plurality of article-supporting rollers having salient portions protruding above the outer side to a roller top level and accessible from the inner side;
a bearing surface disposed proximate the inner side of the belt loop to contact the salient portions of the rollers and cause the rollers to rotate as the conveyor belt advances in the conveying direction and propel articles supported atop the rollers along the outer side in the conveying direction;
a sensor upstream of the bearing surface for measuring the length of a conveyed article;
an actuator selectively movable, according to the measured length of a conveyed article advancing onto the upstream end of the belt, into contact with the retractable stops to move the stops from a retracted position below the roller top level to a blocking position above the roller top level for receiving an article propelled by the rollers.

16. A conveyor as in claim 15 comprising a controller responsive to the sensor and selectively actuating the actuator to move selected stops to the blocking position according to the length of the conveyed article and a preselected spacing between consecutive articles.

17. A conveyor as in claim 15 wherein a retractable stop is positioned on each row.

18. A conveyor as in claim 15 wherein the number of rows in the belt is greater than the number of retractable stops.

19. A conveyor as in claim 15 wherein each row has at least one roller.

* * * * *